2,915,551

ESTERS OF 3-METHYL-3,5-DIHYDROXY PENTANOIC ACID

Donald E. Wolf, Princeton, and Carl H. Hoffman, Scotch Plains, N.J., assignors to Merck & Co., Inc., Rahway, N.J., a corporation of New Jersey No Drawing. Application July 12, 1956
Serial No. 597,330

2 Claims. (Cl. 260—484)

This invention relates to racemic 3-methyl-3,5-dihydroxypentanoic acid, the corresponding $\beta$-methyl-$\beta$-hydroxy-$\delta$-valerolactone, a method for the synthesis of these compounds, and to intermediate esters prepared in the synthesis. The invention also includes the salts and amides of the acid and lactone.

Minute quantities of these substances are useful for promoting the growth of *Lactobacillus acidophilus* ATCC 4963 and certain other lactobacilli used for the production of lactic acid and cottage cheese. These substances are also useful for the promotion of growth in higher animals such as chicks.

The presence of the growth activity of these substances may be determined by microbiological assay with *Lactobacillus acidophilus* ATCC 4963 using the basal medium set forth in Table 1, as follows:

TABLE 1

| Ingredients | Quantity used per liter of medium (in double strength) |
|---|---|
| Acid-hydrolyzed, norit-treated, vitamin-free casein (Note 1). | 10 g. |
| Trypsin-digested, norit-treated vitamin-free casein (Note 2). | 5 g. |
| DL-Tryptophane | 0.4 g. |
| L-Cystine | 0.2 g. |
| DL-$\alpha$-Alanine | 1 g. |
| Glucose | 40 g. |
| Adenine, guanine, xanthine, uracil | 10 mg. each. |
| Thymine, orotic acid | 40 mg. each. |
| Salt A (Note 3) | 20 ml. |
| Salt B (Note 4) | 10 ml. |
| Polysorbate 80 (Tween 80) | 2 ml. |
| Thiamine, pantothenic acid, riboflavin, nicotinic acid | 2 mg. each. |
| Folic acid, pyridoxal, p-amino-benzoic acid | 1 mg. each. |
| Pyridoxine hydrochloride | 4 mg. |
| Biotin | 10 microg. |
| Vitamin $B_{12}$, lipoic acid | 20 microg. each. |
| Final pH 6.5–6.6 (by adjustment with 10% aqueous solution of sodium hydroxide). | |

NOTE 1: The acid-hydrolyzed, norit-treated vitamin-free casein is prepared as follows: 100 gm. of vitamin-free casein (Labco) are refluxed for 8 to 10 hours with 500 ml. of concentrated HCl and 500 ml. of $H_2O$. The HCl is distilled off under a vacuum, the volume is restored with $H_2O$, and the evaporation in vacuo is repeated. The hydrolyzed casein is dissolved in approximately 800 ml. of $H_2O$ and is adjusted to pH 3.0 with 10% NaOH. It then is filtered and the filtrate is stirred for half an hour at room temperature with 10 gm. of activated carbon (Darco G-60), and filtered again. The filtrate is the material used for the basal medium.

NOTE 2: This casein digest is prepared as follows: 25 gm. of vitamin-free casein (Labco) are suspended in 250 ml. of 0.8 per cent $NaHCO_3$ and incubated under benzene with 0.5 gm. of trypsin for 48 hours. After digestion, the material is autoclaved 15 minutes and filtered. The filtrate is taken to pH 2.0, stirred 1 hour with 10 gm. of amorphous carbon (Norit A) and filtered. The filtrate is the material used for the basal medium.

NOTE 3: This is a solution of inorganic salts consisting of 25 gm. of potassium monohydrogen phosphate and 25 gm. of potassium dihydrogen phosphate in 250 cc. of water.

NOTE 4: This is a solution of inorganic salts consisting of 10 gm. of magnesium sulfate heptahydrate, 0.5 gm. of ferrous sulfate heptahydrate and 0.5 gm. of manganese sulfate tetrahydrate dissolved in 250 cc. of water.

The techniques used in connection with the microbiological assay are essentially in accordance with known procedures. Specifically, stock cultures of *Lactobacillus acidophilus* ATCC 4963 are maintained at 5° C. in skim milk medium (Bacto dehydrated skim milk, 100 gms. to 1 liter of water), supplemented with 1 percent of enzymatic digest of casein (Bacto Tryptose). Stocks are transferred every six weeks to duplicate tubes one of which becomes the new stock, the other is held for weekly transfer. Inocula for daily use are prepared by suspending 0.1 ml. of a 24 hour culture in 15 ml. of sterile physiological saline followed by a dilution of 0.5 ml. to 15 ml. of saline. One drop of the second saline suspension is used to inoculate each assay tube. Assay tubes are sterilized at 120° C. for 12 to 15 minutes. Volumes of 10 ml. of the medium of Table 1 are routinely used. Incubation period is 24 hours at 37° The extent of bacterial growth is determined turbidimetrically with a photoelectric colorimeter (Klett-Summerson).

The growth activity of these substances is measured in terms of "units." One-half maximal growth of *Lactobacillus acidophilus* ATCC 4963 is obtained with 0.0005 units of growth activity per ml. of solution under the assay condition described.

The new synthesis comprises reacting a 4-acyloxy substituted 2-butanone (I) with an ester of bromoacetic acid (II) to form an ester intermediate (III) which is then hydrolyzed to the desired acid and lactone, (IV) and (V), as illustrated by the equations below in which R and R' represent lower alkyl groups, i.e. alkyl groups containing about 1–6 carbon atoms.

The preparation of the ester intermediates (III) according to the invention and the equation above is conveniently accomplished by refluxing a solution of a 4-lower acyloxy substituted 2-butanone of formula (I) e.g., 4-acetoxy-2-butanone, and a lower ester of bromoacetic acid of formula (II) e.g., ethyl bromoacetate, in a liquid organic solvent in the presence of metallic zinc. By "lower ester" and "lower acyloxy" we mean ester and acyloxy groups having about 1–6 carbon atoms. The preferred reaction solvent is ether. The metallic zinc employed in the synthesis can be in the form of zinc dust or granular zinc, the latter form being preferred since it produces higher yields. The ester intermediate (III) described above is then hydrolyzed to the desired acid and lactone products.

Suitable 4-acyloxy substituted 2-butanones for use in the synthesis of 3-methyl-3,5-dihydroxypentanoic acid can be prepared according to methods described in the literature. For example, 4-acetoxy-2-butanone, a preferred reactant, can be derived from 4-hydroxy-2-butanone by the method of Buchman and Sargent, Journal American Chemical Society, 67, 400 (1945), or by the method described in U.S. Patent 2,010,828. The preparation of 4-hydroxy-2-butanone is described by Bolle, Jean and Jullig, Mem. services chim. etat (Paris) 34, 321 (1948).

The synthesis of racemic 3-methyl-3,5-dihydroxypentanoic acid, its delta-lactone, salts and amides, and the use of these materials in promoting check growth is illustrated by the examples below.

*Example I.—Preparation of the acid and lactone*

A. PREPARATION OF ETHYL 3-METHYL-3-HYDROXY-5-ACETOXY PENTANOATE

Granular zinc, 120 g. (1.84 mols) was cleaned by the action of dilute hydrochloric acid, washed successively with water, acetone and benzene, and transferred to a 3 necked 1 liter flask. The washed zinc was then dried by azeotropic removal of water with benzene. The excess benzene was removed from the flask and a mixture of 124 g. (0.96 mol) of 4-acetoxy-2-butanone and 166 g. (1.0 mol) of ethyl bromoacetate in 450 ml. of ether (dried over sodium) was added to the flask over a period of about 1¼ hours at a rate which produced gentle refluxing. Reaction began immediately with the first addition of reactants to the zinc. The rate of stirring was controlled to prevent excessive cooling of the reaction mixture to avoid slowing the reaction. Stirring and heating were continued for about 1 to 2 hours after the final addition of reactants.

The reaction mixture was then decanted from the unreacted zinc (55 g.) into a mixture of crushed ice and water (400–500 g.). The cooled mixture was acidified to Congo red by the addition of 85 ml. of concentrated hydrochloric acid. The resulting organic and aqueous layers were separated. The aqueous layer was extracted twice with 100-ml. portions of chloroform. The ether layer was washed with a saturated aqueous solution of sodium bicarbonate until all of the acid had been removed. The chloroform extract was then washed with the same sodium bicarbonate solution which had been used to wash the ether. The ether layer was then washed with a saturated aqueous sodium chloride solution.

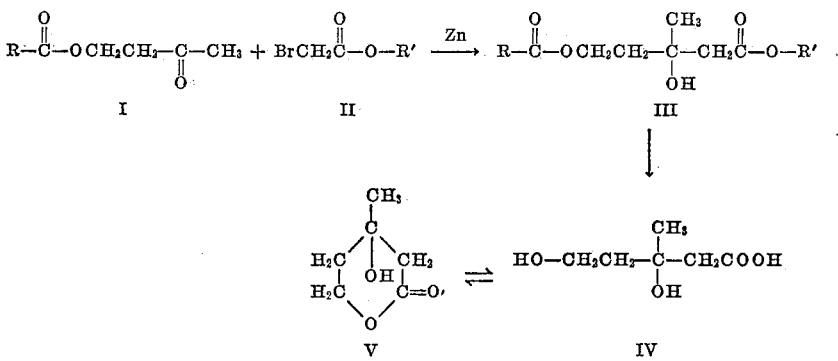

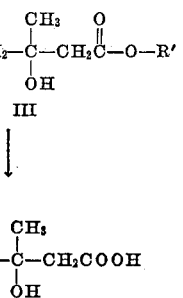

The two organic layers were combined, dried and concentrated. The resulting residue was fractionated under reduced pressure to give the desired ester intermediate, ethyl 3-methyl-3-hydroxy-5-acetoxypentanoate, which had a boiling point of 89–91° C. at 300 microns of Hg pressure and a refractive index of $N_D^{25}$ 1.4420. Indices of 1.4450–1.4460 were obtained in other runs employing less pure reactants.

B. HYDROLYSIS OF ETHYL 3-METHYL-3-HYDROXY-5-ACETOXYPENTANOATE TO 3 - METHYL - 3,5 - DIHYDROXYPENTANOIC ACID AND LACTONE

Ethyl 3-methyl-3-hydroxy-5-acetoxypentanoate, 47.5 g., (0.21 mol) was dissolved in 100 ml. of ethanol and 50 ml. of water was added to the solution. One drop of phenolphthalein solution (1% in ethanol) was added and the solution was warmed to about 60° C. Then 6.4 N sodium hydroxide was added slowly to the stirred solution while maintaining the pH at the turning point of the phenolphthalein indicator. A total of 2 equivalents of alkali was added. The solution was cooled and 2 equivalents of 6.4 N hydrochloric acid was added. The aqueous solution was then concentrated in vacuo while maintaining the pot at a temperature of about 60–65° C. The final traces of water were removed by adding chloroform and distilling the solvent. The residue was subjected to vacuum for one hour and then extracted twice with 200 ml. portions of chloroform. The salts were removed from the chloroform solution by filtration. The combined chloroform extracts were dried over anhydrous magnesium sulfate, filtered and concentrated in vacuo to give the product which consisted of a mixture of racemic 3 - methyl - 3,5 - dihydroxy-pentanoic acid and lactone. The product was characterized by the formation of its salt with N,N'-dibenzylethylenediamine and tested for microbiological activity.

*Example II.—Preparation of the salts*

A. PREPARATION OF N,N'-DIBENZYLETHYLENEDIAMMONIUM BIS-(3,5-DIHYDROXY-3-METHYLPENTANOATE

The product of Part B above was dissolved in 100 ml. of water and a solution of 26 g. of N,N'- dibenzylethylenediamine in 100 ml. of methanol was added. The mixture was stirred and clarified by the addition of small portions of methanol. Stirring was continued overnight and the mixture concentrated in vacuo to remove most of the methanol. The aqueous phase was extracted with 50 ml. of chloroform to remove unreacted N,N' - dibenzylethylenediamine. The aqueous phase was then concentrated in vacuo to yield a salt which was dissolved in 125 ml. of hot methanol. One liter of ether was added to the hot methanol solution, about 80% being added initially until the first turbidity developed and the remainder after crystallization had started. The product, N,N'-dibenzylethylenediammonium bis-(3,5-dihydroxy-3-methylpentanoate), which crystallized slowly had a melting point of 124–125° C.

The mother liquor from the crystallization, which contained a small amount of amine salt and a large amount of unreacted lactone, and the chloroform washings of the aqueous solution of the DBED (dibenzylethylenediammonium) salt were combined and concentrated in vacuo. The resulting residue was dissolved in 100 ml. of water and a solution of 25 g. of N,N'-dibenzylethylenediamine in 100 ml. of methanol was added. The reaction mixture was then stirred overnight and worked up in the manner described above to yield a pure salt having a melting point of 125–126° C.

The DBED salts prepared above had an activity of 47 units/mg. in a *Lactobacillus acidophilus* ATCC 4963 microbiological assay carried out as described above.

B. PREPARATION OF SODIUM 3,5-DIHYDROXY-3-METHYLPENTANOATE

Fifteen grams (.028 mole) of N,N'-dibenzylethylenediammonium bis - (3,5 - dihydroxy-3-methylpentanoate) was dissolved in 100 ml. of water and 56 ml. of 1 N sodium hydroxide (.056 mole) was added. The aqueous solution was washed with ether and then lyophilized to yield 15 g. of sodium 3,5-dihydroxy-3-methylpentanoate.

In a similar manner salts of this acid and any alkali forming (alkali or alkaline earth) metal can be formed by reacting equivalent amounts of base and N,N'-dibenzylethylenediammonium bis salt as described above.

*Example III.—Preparation of the amides*

A. PREPARATION OF THE BENZHYDRYLAMIDE OF 3-METHYL-3,5-DIHYDROXYPENTANOIC ACID

Benzhydrylamine was isolated as the free base by treating of 61 g. (approximately 0.3 mol. or 100% excess) of benzhydrylamine hydrochloride with 500 ml. of water and sufficient 2.5 N sodium hydroxide solution to make the mixture strongly alkaline. The oily precipitate of base was removed from the water solution by three extractions with chloroform (total volume, approximately 300 ml.). The chloroform solution was dried over anhydrous magnesium sulfate, filtered, and the filtrate concentrated. The residual base was combined with 18.0 g. of lactone as prepared in Example I B, using a little chloroform as solvent. The solvent was evaporated under vacuum and the residue was heated on a steam bath for one hour. The oil was taken up in chloroform and washed with a large excess of dilute hydrochloric acid. The chloroform layer was washed with sodium bicarbonate solution, then with water, dried over anhydrous magnesium sulfate and filtered; the filtrate was concentrated to a residue which crystallized when pumped free of solvent.

This benzhydrylamide was crystallized readily from ether by boiling with a large excess (approximately 800 ml.; which left a trace of insoluble oil and crystalline residue), adding 5 g. of Norit decolorizing carbon and filtering the solution while hot. The filtrate was boiled down to about 200 ml. and cooled in an ice bath. Filtration and drying yielded a first crop of the benzhydrylamide of 3-methyl-3,5-dihydroxypentanoic acid; melting point, 91–93° C. A second crop, melting point, 85–87° C., was obtained by further concentration of the mother liquor. This second crop was recrystallized twice from ether, yielding a product melting at 92–94° C.

The above sample of benzhydrylamide was combined with material of similar quality (0.79 g.) and recrystallized again from ether. A crop melting at 94–96° C. was obtained. A sample of this was dried 4 hours at 60° C. under vacuum (0.1 mm. or less). The infrared spectrum was examined and found to contain the expected absorptions in the $3.1\mu$ region (-NH, -OH) and $6.2$–$6.5\mu$ region (amidic function). The microbial activity of the sample was determined by assay using Lactobacillus ATCC 4963 in the usual way. The activity of the dl-benzhydrylamide was 36.3 units/mg. when assayed after hydrolysis.

B. PREPARATION OF N-(D-α-PHENETHYL)-3,5-DIHYDROXY-3-METHYLPENTANOIC ACID AMIDE

Six and six-tenths grams of β-methyl-β-hydroxy-δ-valerolactone and 10 g. of d-α-phenethylamine were mixed and heated at 100–110° for one hour. The reaction mixture was taken up in chloroform and the chloroform solution was washed with 1 N hydrochloric acid, saturated aqueous sodium bicarbonate and finally with water. The chloroform solution was dried over magnesium sulfate, filtered and concentrated in vacuo to yield 4.8 g. of the d-α-phenethylamide of 3,5-dihydroxy-3-methyl pentanoic acid. The infrared spectrum of the compound in chloroform solution confirmed the presence of an amidic carbonyl function by absorption at 6.06 and 6.5–6.6 $\mu$.

In general, amides from any primary or secondary amine and β-hydroxy-β-methyl-δ-valerolactone can be prepared in a similar manner.

The following specific examples illustrate the growth promoting effect of the compounds of the present invention when fed to young chickens.

CHICK GROWTH ACTIVITY

Example IV

A purified basal chick diet was prepared containing the ingredients set forth in the following table:

TABLE 2

Basal diet

| Ingredient | Amount in Total Mixture, percent |
| --- | --- |
| Glucose (Cerelose, Corn Products Refining Co.) | 48.0 |
| Casein (Vitamin-test, General Biochemicals Inc.) | 18.0 |
| Gelatin | 10.0 |
| Salt Mixture (Note 1) | 6.0 |
| Cellulose (Celluflour, Chicago Dietetic Supply Co.) | 5.0 |
| Soybean Oil | 4.0 |
| Dextrin (White) | 3.0 |
| Calcium Gluconate | 2.5 |
| Glycine | 2.0 |
| Choline Methionine Tartrate | 0.6 |
| L-Arginine | 0.5 |
| DL-Methionine | 0.3 |
| Vitamin B Mixture (see Note 2). | |
| Vitamins A, D, E, and K (see Note 3). | |

NOTE 1: *Salt mixture.*—This is a mixture of the following salts in the following amounts:

| Salt | Percent in mixture | Per 100 gm. of diet |
| --- | --- | --- |
| NaCl | 13.9 | 0.83 gm. |
| KH$_2$PO$_4$ | 38.8 | 2.33 gm. |
| MgSO$_4$ | 5.7 | 0.34 gm. |
| CaCO$_3$ | 38.1 | 2.29 gm. |
| FeSO$_4$.7H$_2$O | 2.7 | 0.16 gm. |
| KI | 0.079 | 4.7 mg. |
| MnSO$_4$.2H$_2$O | 0.45 | 260.7 mg. |
| ZnCl$_2$ | 0.026 | 1.56 mg. |
| CuSO$_4$.5H$_2$O | 0.047 | 2.86 mg. |
| CoCl$_2$.6H$_2$O | 0.022 | 1.36 mg. |

NOTE 2: *Vitamin B mixture.*—This mixture provides the following vitamins in the amount indicated for each 100 gms. of diet:

| Vitamin | Per 100 gm. of diet |
| --- | --- |
| | Mg. |
| Thiamine hydrochloride | 2.0 |
| Riboflavin | 2.0 |
| Calcium Pantothenate | 4.0 |
| Niacin | 10.0 |
| Pyridoxine hydrochloride | 2.0 |
| Biotin | 0.04 |
| Folic Acid | 0.4 |
| Vitamin B$_{12}$ | 0.01 |
| Inositol | 100.0 |
| Para-aminobenzoic Acid | 30.0 |

NOTE 3: *Mixture of vitamins A, D, E and K.*—This mixture, dissolved in some of the soybean oil of the purified diet, provides the following vitamins in the amount indicated for each 100 gms. of diet:

| Vitamin | Per 100 gm. of diet |
| --- | --- |
| A and D Concentrate containing 450,000 units of Vitamin A per gm., 100,000 units of Vitamin D per gm. | 25 gm. |
| α-tocopherol acetate (Vitamin E) | 20 mg. |
| Menadione (Vitamin K) | 4 mg. |

This vitamin mixture includes 200 mg. (for each 100 gm. of diet) of butylated hydroxyanisol (Tenox, Tennessee Eastman Corp.) serving as an antioxidant for the above vitamins.

It is evident that the foregoing purified chick diet contains all ingredients or factors known as essential for chick growth.

In the chick growth experiments one group of chicks, serving as the control, was fed the purified basal diet whereas a second group and a third group of chicks were fed the same basal diet to which had been added N,N'-dibenzylethylenediammonium bis(3,5-dihydroxy-3-methylpentanoate) which is referred to herein as the "DBED salt." The amount of DBED salt was such that 100 units of growth activity were added per 100 g. of basal diet. In more familiar terms this amounts to about 2 mg. of DBED salt per 100 g. of the basal diet. A suitable mixing procedure was used to insure a reasonably complete and uniform distribution of the DBED salt throughout the diet.

The chicks were New Hampshire Red-Silver Cornish cross strain of chicks. The chicks were secured from the hatchery right after they were hatched and placed on test promptly, so that the chicks, after hatching, received no food other than the one they received throughout the test. Each group consisted of 15 chicks, all cockerels, with the average weight of the chicks in each group about the same. The chicks were individually weighed and wing banded for identification at the beginning of the experiment.

After the chicks had been on test for 31 days (at which time the chicks were not over 32, or at most 33, days old), the chicks were individually weighed again and their average weight gain determined. The results are shown in the following table:

TABLE 3

| Group | Weight gain in 31 days, g. |
|---|---|
| 1. Control; Chicks fed purified basal diet | 449 |
| 2. Chicks fed purified basal diet plus DBED salt | 506 |

*Example V*

In this test a group of 30 chicks (in two sub-groups of 15 each) was used as the control group fed the purified basal diet (described in detail in Example IV), and a second group of 30 chicks (in two sub-groups of 15 each) was fed the same purified basal diet supplemented with DBED salt (100 units/100 g. of basal diet). The chicks were New Hampshire Red-Silver Cornish cross strain of chicks, as in Example IV, and the test procedures were the same as in Example IV. The results are shown in the following table:

TABLE 4

| Group | Weight gain in 31 days, g. |
|---|---|
| Control; chicks fed purified basal diet | 447 |
| Chicks fed purified basal diet plus DBED salt | 516 |

*Example VI*

In this test a group of 30 chicks (in two sub-groups of 15 each) was used as the control group fed the purified basal diet (described in detail in Example IV), and a second group of 30 chicks (in two sub-groups of 15 each) was fed the same purified basal diet supplemented with DBED salt (100 units/100 g. basal diet). The chicks were New Hampshire Red chicks. The test procedures were the same as in Example IV. The results are shown in the following table:

TABLE V

| Group | Weight gain in 31 days, g. |
|---|---|
| Control; chicks fed purified basal diet | 480 |
| Chicks fed purified basal diet plus DBED salt | 528 |

*Example VII*

A basal chick diet was prepared containing the ingredients set forth in the following table:

TABLE 6

Basal diet

| Ingredient | Amount in Total Mixture, lbs. |
|---|---|
| Basal mash (Note 1) | 90.0 |
| Corn | 9.0 |
| Soybean oil meal | 20.0 |
| Fat | 10.0 |
| Methionine | 0.063 |
| Bone meal | 1.0 |
| Total | 130.0 (approx.) |

NOTE 1: *Basal mash*—

| Ingredient | Amount, pounds |
|---|---|
| Ground yellow corn | 1,200.0 |
| Soybean oil meal | 1,000.0 |
| Sodium chloride | 12.25 |
| Manganese sulfate | 0.88 |
| Ground limestone | 35.00 |
| Bone meal | 55.00 |
| Vitamin and antibiotic supplement in ground corn (Note 2) | 15.00 |
| Total | 2,318.13 |

NOTE 2: Fifteen pounds of the vitamin and antibiotic supplement contained the following ingredients in the designated amounts; the remainder being corn meal:

| Ingredient | Amount, grams |
|---|---|
| $D_3$ (1,172,500 I.C.U.) | |
| A (7,875,000 I.U.) | |
| E (17,500 I.U.) | |
| Riboflavin | 7.0 |
| Calcium pantothenate | 14.0 |
| Niacin | 35.0 |
| Choline chloride | 595.0 |
| $B_{12}$ | 0.875 |
| Folic Acid | 0.875 |
| Penicillin | 10.0 |
| Streptomycin | 40.0 |

Forty one-day old White Rock cockerels were divided into two groups of 20 chicks; the average weight of the chicks and the distribution of chick weights in each group were approximately the same. The chicks in one group were fed the basal diet described above; the chicks in the other group were fed the basal diet supplemented with N,N'-dibenzyl-ethylendiammonium bis-(3,5-dihydroxy-3-methylpentanoate). This DBED salt had been premixed with corn meal in the ratio of 20 mg. of the salt (having an activity of about 43 units/mg.), to 1 g. of premix. The corn meal premix was added to the basal diet in the ratio of 1 g. of premix to 1 kg. of final diet. Consequently, 1 kg. of final diet contains 20 mg. of the DBED salt, or approximately 860 units of growth activity. The test was continued until the chicks were 10 weeks old, at which time the average weights of chicks in the two groups were determined. The results of the test are summarized in the table below.

TABLE 7

| Group | Average Weight in 10 weeks, pounds |
|---|---|
| 1. Control; chicks fed basal diet | 3.800 |
| 2. Chicks fed basal diet plus DBED salt | 3.926 |

Examples IV–VII clearly demonstrate that the compounds of the present invention promote the growth of chicks when included in basal diets of the types described in amounts calculated to supply from about 50 to about 200 units of growth activity in 100 g. of feed.

*Example VIII.—Preparation of pure β-hydroxy-β-methyl-δ-valerolactone*

N,N'-dibensylethylenediammonium bis-(3,5-dihydroxy-3-methylpentanoate) 44.4 g. (0.08 mole), was dissolved in about 100 ml. of water and 170 ml. of 1N sodium hydroxide was added. The N,N'-dibenzylethylenediamine was removed by ether extraction. The aqueous solution of sodium salt was passed through a column of sulfonic acid type ion exchange resin (Amberlite IR 120 on the hydrogen cycle), and the eluate was lyophilized. The residue was taken up in chloroform and the solution was dried over anhydrous magnesium sulfate, filtered and concentrated in vacuo to yield an oil.

A sample of the oil was evaporatively distilled at about

90° C. and at 0.3 mm. to yield the pure lactone, β-hydroxy-β-methyl-δ-valerolactone, $$\lambda_{max.}^{CHCl_3}\ 2.95\ \text{and}\ 5.79\ \mu.$$

A portion of the distilled lactone (0.84 g.) was dissolved in a small amount of acetone and ether was added to the point of incipient cloudiness. When the solution was cooled in a Dry Ice-acetone bath, the lactone crystallized. The product was collected by filtration and washed with ether to yield β-hydroxy-β-methyl-δ-valerolactone, M.P. 26–28° C. Recrystallization of the product gave material melting at 27–28° C. The product is hygroscopic.

The specific examples of the preparation of the compounds of the present invention and the use of these compounds in promoting the growth of chicks are given by way of illustration only and are not to be construed as limiting the scope of the invention.

What is claimed is:

1. A compound of the formula

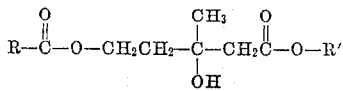

in which R and R' represent lower alkyl groups.

2. Ethyl 3-methyl-3-hydroxy-5-acetoxypentanoate.

References Cited in the file of this patent

Barnett et al.: Biochem. J., vol. 36, pp. 357–63 (1942). (See C. A. vol. 37, p. 345' (1943).)

Wilson: J. Chem. Soc. (1945), 48–51. (See C. A., 39, 2748[5] (1945).)

Shriner: Organic Reactions, vol. 1, pp. 1–37, Wiley (1942).